United States Patent [19]

Netravali et al.

[11] 4,218,703
[45] Aug. 19, 1980

[54] TECHNIQUE FOR ESTIMATION OF DISPLACEMENT AND/OR VELOCITY OF OBJECTS IN VIDEO SCENES

[75] Inventors: Arun N. Netravali, Matawan; John D. Robbins, Aberdeen, both of N.J.

[73] Assignee: Bell Telephone Laboratories, Incorporated, Murray Hill, N.J.

[21] Appl. No.: 21,063

[22] Filed: Mar. 16, 1979

[51] Int. Cl.² .................................................. H04N 7/12
[52] U.S. Cl. ............................ 358/136; 358/105; 358/108; 375/28
[58] Field of Search .............. 358/136, 93, 105, 108, 358/109, 160; 325/38 B

[56] References Cited

U.S. PATENT DOCUMENTS

| | | |
|---|---|---|
| 3,603,725 | 9/1971 | Cutler .................................. 358/136 |
| 3,632,865 | 1/1972 | Haskell et al. . |
| 3,716,667 | 2/1973 | Conner et al. . |
| 3,723,644 | 3/1973 | Haskell et al. . |
| 3,890,462 | 6/1975 | Limb et al. . |

*Primary Examiner*—Richard Murray
*Attorney, Agent, or Firm*—Barry H. Freedman

[57] ABSTRACT

A technique for estimation of displacement and/or velocity of objects in television scenes is recursive, in that each displacement calculation is made using the results of the previous calculation. In a first embodiment, a displaced frame difference DFD (i.e., the intensity difference between a spatial location in the present video frame and a location in the previous frame displaced from that location by an initial displacement estimate) is updated using the initial value of DFD normalized by a measure of local picture activity. In a second embodiment, the update is a multiplicative function of DFD and the intensity gradient at the displaced location in the previous frame.

19 Claims, 3 Drawing Figures

TECHNIQUE FOR ESTIMATION OF DISPLACEMENT AND/OR VELOCITY OF OBJECTS IN VIDEO SCENES

BACKGROUND OF THE INVENTION

1. Field of the Invention

This invention relates generally to a method and apparatus for estimating the displacement and/or velocity of moving objects in television scenes or other picture sequences.

2. Description of Prior Art

Velocity and displacement estimation has been found to be useful in many applications including tracking and surveillance systems, evaluation of photographs taken from satellites, and in efficient coding of moving picture sequences for transmission and/or storage. One technique for measuring velocity is described in the context of a predictive video encoder in U.S. Pat. No. 3,632,865 issued to B. G. Haskell et al on Jan. 4, 1972. In that patent, the intensity of a particular picture location in a present frame is correlated with the intensity of a series of displaced picture locations in a previous frame, using a series of correlators. The correlator outputs are then integrated as the interframe intensity correspondence between other moving locations in the picture are evaluated. This approach to velocity determination proved cumbersome, in that many multiplications were required for each moving picture element. For example, if it were desired to determine velocity in the range of 0–4 pels per frame (pef) with an accuracy of 0.25 pef, a moving area correlation coefficient would be needed for each of the 1089¼ element possible displacements. Obviously, greater precision or a larger velocity range would require even larger processing capability.

A significant reduction in the number of computations required in the Haskell et al technique was enabled by a velocity estimation scheme described in U.S. Pat. No. 3,890,462 issued to J. O. Limb and J. A. Murphy on June 17, 1975. This scheme is based upon a recognition that the amount of frame difference signal (difference in intensity of a particular location in a picture from one frame to the next) generated by a moving object is a function of its speed and also of the size of the object and the amount of detail it contains. Furthermore, since size and detail are related to the amount of the element or line difference signal (difference in intensity between two particular locations in the same picture frame) generated by the object, an estimate of speed which is largely independent of size and detail can be obtained by normalizing the frame difference by the element or line difference.

Mathematically, the displacement calculation described by Limb and Murphy (for the horizontal or x direction) is given by $$\Delta x = \frac{\sum_i (FDIF)_i \cdot Sgn(EDIF)_i}{\sum_i |EDIF_i|} \quad (1)$$

where FDIF is the frame difference, EDIF is the element difference, and the summation is carried over those elements in the picture for which FDIF is above a threshold value, indicating moving area. To calculate $\Delta y$, (displacement in the vertical direction) a corresponding computation is made using line difference LDIF rather than element difference EDIF. Naturally, speed or velocity can be calculated from the appropriate vector combinations of $\Delta x$, $\Delta y$ and $\Delta t$.

While the Limb-Murphy technique resulted in fewer calculations than are required in the Haskell invention, it was based upon a simplification of a Taylor series expansion which assumed that $\Delta x$ was small. However, when $\Delta x$ is large, the Taylor's approximation becomes inaccurate, seriously degrading the displacement estimate. Also, the technique sometimes provides unsatisfactory results in scenes with multiple moving objects.

In view of the foregoing, it is the broad object of the present invention to provide means and a method for more accurately determining the displacement and/or velocity of moving objects in video scenes or the like. The technique must be adaptable to pictures with regions of differing movement, and must be capable of implementation in a manner that is not unduly complex or expensive.

SUMMARY OF THE INVENTION

In accordance with the present invention, the displacement of an object in a video scene is determined recursively, using the previous displacement estimate to update the present displacement estimate. The recursion can be performed for each picture element, for a group of picture elements, or for an entire field or frame. Indeed, in some instances, estimates can be made repeatedly for a given picture element. The recursive nature of the present invention is characterized by a feedback path between the output of the system (which indicates displacement) and the system itself, such that the error between each successive displacement estimate and the true displacement approaches zero in the ideal case.

In accordance with the present invention, the accuracy of the displacement estimate is considerably improved. This, in turn, enables discrimination between moving objects and uncovered background in the image being processed, and can lead to improved encoder design. The recursive techniques of the present invention are readily implemented in a series of embodiments which are not unduly complex or expensive.

DESCRIPTION OF THE DRAWING

The present invention will be more readily appreciated by reference to the following detailed description when read in light of the accompanying drawing in which.

DETAILED DESCRIPTION

An understanding of the derivation of Equation (1) above will be instructive in appreciating the present invention. Assuming that each frame of video information is scanned along a plurality of generally parallel horizontal scan lines and that the location of a point within the picture can be expressed either in standard (x,y) rectilinear notation or as a two dimensional vector x, the intensity of a particular point in the picture can be represented as $I(x,t)$ at time t and $I(x, t-\tau)$ for the preceding frame where $\tau$ is the time between frames. If an object within the picture moves in translation, and disregarding for the moment any uncovered background in the moving area, each point in the present frame will have an intensity which corresponds to the intensity of a particular (usually different) point in the preceding frame. Thus, $$I(x,t) = I(x-D, t-\tau) \quad (2)$$

where D is the translation vector of the object during the interval $\tau$ between frames.

Traditionally, the frame difference signal FDIF at spatial position x is given by:

$$FDIF(x) \equiv I(x,t) - I(x, t-\tau), \quad (3a)$$

indicating that FDIF is the intensity difference over a time interval $\tau$ at a fixed location x. However, the same difference may be expressed in spatial terms:

$$FDIF = I(x,t) - I(x+D,t) \quad (3b)$$

since the intensity of location $x+D$ at time t is assumed to be the same as the intensity at location x in the previous frame (time $t-\tau$).

Equation (3b) can be written, for small D, by a Taylor's expansion about x as:

$$FDIF(x) = -D^T \nabla I(x,t) + \text{Higher Order Terms in D}, \quad (4)$$

where $\nabla$ is the gradient with respect to x and the superscript T on a vector denotes its transpose. If the translation of the object is constant over the entire moving area (except for the uncovered background) and if the higher order terms in D can be neglected, then both sides of equation (4) can be summed over the entire moving area to obtain an estimate $\hat{D}$ of translation, as follows:

$$\hat{\underline{D}} = - \begin{vmatrix} \frac{\Sigma FDIF(\underline{x}) \text{ sign}(EDIF(\underline{x}))}{\Sigma |EDIF(\underline{x})|} \\ \frac{\Sigma FDIF(\underline{x}) \text{ sign}(LDIF(\underline{x}))}{\Sigma |LDIF(\underline{x})|} \end{vmatrix} \quad (5)$$

$$\text{where sign}(z) = \begin{cases} 0, & \text{if } z = 0 \\ \frac{z}{|z|}, & \text{otherwise} \end{cases} \quad (6)$$

Equation (5) is identical to one of the equations given by Limb and Murphy, and recognizes that $\nabla I$ can be a vector of element and line differences (EDIF, LDIF, respectively) if the intensity of the picture is available on a discrete grid, as is true when the intensity signal is sampled. The upper term in equation (5) pertains to displacement in the horizontal direction, while the lower term pertains to the vertical direction.

As stated above, the estimate for D is valid only so long as D is small; as D increases, the quality of the Taylor series approximation becomes poor. In accordance with the present invention, this is overcome by linearizing the intensity function around an initial estimate of D. Thus, for the $i^{th}$ frame, the displacement estimate $\hat{D}^i$ can be obtained by linearizing the intensity function around the displacement estimate for the previous ((i-1)th) frame. This process results in the following recursion:

$$\hat{D}^i = \hat{D}^{i-1} + U^i \quad (7)$$

where $\hat{D}^{i-1}$ is an initial estimate of $\hat{D}^i$ and $U^i$ is the update of $\hat{D}^{i-1}$ to make it more accurate, i.e., an estimate of $D - \hat{D}^{i-1}$.

We now define the quantity DFD $(x, \hat{D}^{i-1})$, called the displaced frame difference (DFD), which is analogous to FDIF(x) used in equations 3a and 3b:

$$DFD(x, \hat{D}^{i-1}) \equiv I(x,t) - I(x - \hat{D}^{i-1}, t-\tau) \quad (8)$$

From equation (8), it is seen that DFD is defined in terms of two quantities: (a) the spatial location x at which it is evaluated and (b) the displacement $\hat{D}^{i-1}$ with which it is evaluated. Obviously, in the case of a two dimensional grid of discrete samples, an interpolation process is used to evaluate $I(x - \hat{D}^{i-1}, t-\tau)$ for nonintegral values of $\hat{D}^{i-1}$. As defined, DFD has the property of converging to zero as $\hat{D}^i$ converges to the actual displacement D, of the object. Also DFD=FDIF, when $\hat{D}^{i-1}=0$.

DFD can be expanded in a manner similar to that used above:

$$DFD(\underline{x}, \hat{\underline{D}}^{i-1}) = I(\underline{x}, t) - I(\underline{x} + (\underline{D} - \hat{\underline{D}}^{i-1}), t) \quad (9)$$
$$= -(\underline{D} - \hat{\underline{D}}^{i-1})^T \nabla I(\underline{x}, t) + \text{Higher Order Terms}$$

Neglecting higher order terms and making approximations similar to those used for equation (5), an estimate of $D - \hat{D}^{i-1}$ results, which, when combined with equation (7), yields:

$$\hat{\underline{D}}^i - \hat{\underline{D}}^{i-1} = - \begin{bmatrix} \frac{\Sigma DFD(\underline{x}, \hat{\underline{D}}^{i-1}) \cdot \text{sign}(EDIF(\underline{x}))}{\Sigma |EDIF(\underline{x})|} \\ \frac{\Sigma DFD(\underline{x}, \hat{\underline{D}}^{i-1}) \cdot \text{sign}(LDIF(\underline{x}))}{\Sigma |LDIF(\underline{x})|} \end{bmatrix} \quad (10)$$

In equation 10, the summations are carried over the entire moving area.

The upper term in equation 10 deals with displacement in the horizontal direction and the lower term concerns displacement in the vertical direction. From equation 10, it can be seen that, in accordance with the present invention, each displacement estimate is an update of the previous estimate, and uses the previous estimate in making the update. Initially, for $\hat{D}^{i-1}=0$, DFD=FDIF. Thereafter, $\hat{D}^i$ is updated using $\hat{D}^{i-1}$ and a correction term which is a function of (a) DFD and EDIF for the x direction, and (b) DFD and LDIF for the y direction. Stated differently, the update is a function of the previous displacement estimate, which is used to compute a displaced frame difference which is then normalized to account for local intensity variations between the element being processed and neighboring picture elements.

Figure 1:
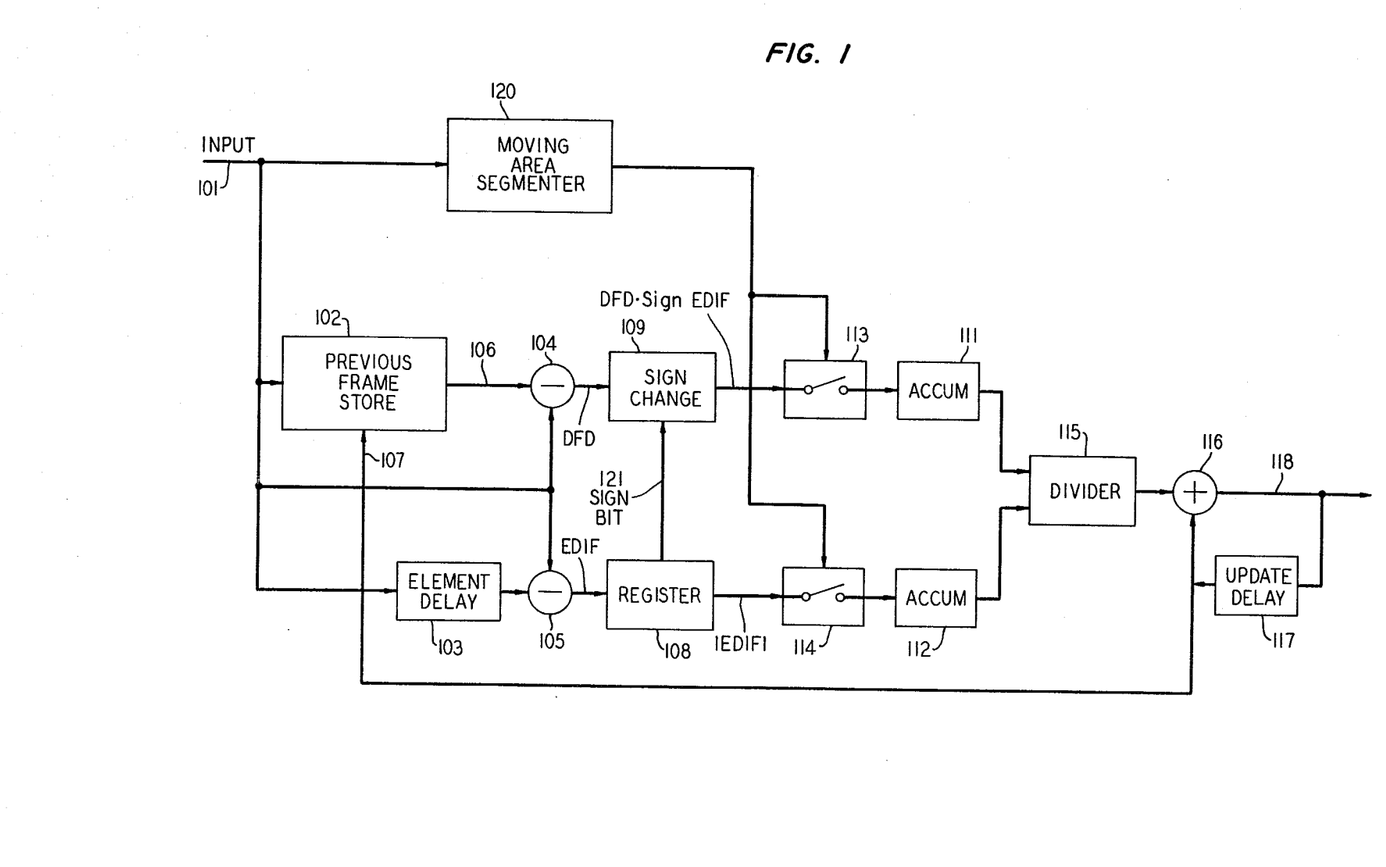
FIG. 1 is a block diagram of apparatus for recursively computing an estimate of the horizontal component of displacement in a series of pictures in accordance with the present invention.

A first embodiment of the present invention which implements the calculation expressed in the upper term in equation (10) with respect to displacement in the x direction only is shown in block diagram form in FIG. 1. Input signal samples, each of which represent the intensity of a picture at a particular location (pel) within the picture are applied on input line 101. These samples may be obtained by conventional scanning and sampling apparatus well known to those skilled in the art, or from any other means arranged to provide intensity information for a series of pel locations. Uniform formatting is used for intensity data derived from successive picture frames.

The samples on line 101 are applied to a frame store 102, to an element delay circuit 103, and to first inputs of a pair of subtraction circuits 104 and 105. Frame store 102 is advantageously a tapped delay line arranged to provide an output on line 106 which represents the intensity value at a particular spatial location in the previous frame. The exact location is selected by virtue of a control signal applied on line 107. In accordance with the invention, this control signal is a function of the previous displacement estimate, and the location chosen is the one that best corresponds to the location in the present frame that is being processed. Element delay circuit 103 is arranged to provide an output which is delayed by one sample interval $\tau$ with respect to its input.

The intensity value output from frame store 102 on line 106 is coupled to the second input of subtraction circuit 104 while the intensity value output from element delay circuit 103 is coupled to the second input of subtraction circuit 105. Inasmuch as the location selected in the previous frame is displaced from the presently processed location by the previous displacement estimate, the output of circuit 104 is thus the displaced frame difference DFD defined in equation (10). The output of subtraction circuit 105 is the element difference EDIF also defined in equation (10).

The sign bit of the element difference EDIF is extracted from a register 108 connected to the output of subtractor circuit 105, and used to selectively control the sign of DFD in a sign change circuit 109 which receives the output from subtractor circuit 104. This control, on line 121, satisfies the "sign" function in equation (10). Thereafter, the algebraic value of the product of DFD and the sign of EDIF is accumulated in a first accumulator 111, while the magnitude of EDIF is summed in a second accumulator 112. However, since the calculation of equation (10) is made only in moving areas, switches 113 and 114 (interposed in the input lines to accumulators 111 and 112, respectively) are only closed in unison in the presence of an appropriate control signal from moving area segmenter 120. The latter, which may be constructed in a manner similar to the apparatus of FIG. 2 in a paper by Haskell et al entitled "Interframe Coding of 525-line Monochrome Television at 1.5 Mbits/s in *IEEE Transactions on Communications*, Vol. Com-25, No. 11, November 1977, pages 1339-1348, is designed to close switches 113 and 114 when the frame difference FDIF exceeds a preset threshold value.

The values contained in accumulators 111 and 112, which are the numerator and denominator, respectively, of the upper term in equation (10), are divided in a divider circuit 115 and applied to a first input of an adder 116 at the end of each computation interval of N pels. This input represents the x direction displacement update term, and is added to the previous x direction displacement estimate $\hat{D}^{i-1}$. The adder output is returned to the input of a delay circuit 117 to become the next value to be updated. The output of delay circuit 117, representing the previous displacement estimate, is also the control input to frame store 102 on line 107, as explained above. The contents of accumulators 111 and 112 are cleared at the end of each N pel interval.

While the apparatus of FIG. 1 is designed to compute displacement in the x direction, y direction displacement (according to the lower term in equation (10)) is computed in a similar manner, using a line delay circuit in lieu of element delay 103. In this way, line difference LDIF is output from subtraction circuit 105, rather than element difference EDIF.

Computer simulations of the apparatus shown in FIG. 1 indicate that recursions using a field interval produce a good estimate of displacement; naturally, the rate of convergence varies with the interval and with the types of picture sequences used. While a choice of a field interval is typical, a recursion can be performed for a smaller block, (e.g., 16×16 pels) if desired.

Frame store 102 may be constructed quite simply, if a further approximation is made in equation (10), such that the initial and subsequent estimates of displacement D only include integral components, which may be formed by truncating or rounding the control signal fed back on line 107. In this event, store 102 may be a tapped delay line of the type designated 35 in FIG. 3 of the Haskell patent cited above, together with a data switch (36 in FIG. 3) which selects appropriate taps. Alternatively, if the components of D are non-integers, the output of the tapped delay line must be interpolated using techniques which will be apparent to those skilled in the art.

While the apparatus of FIG. 1 can be used in many applications noted above, certain modification to the displacement estimation technique are suggested when the estimator is to be used in a predictive encoder. First, since an encoder operates on a pel by pel basis, it is advantageous to revise the displacement estimate for every moving area pel. This has the side benefit of overcoming, to a large extent, the problems which occur due to multiple moving objects or to different parts of an object undergoing different displacements, since the recursion occurs more frequently. Of course, rapid convergence of the recursion equation is necessary.

Second, in a predictive encoder, it is desirable to minimize prediction error, so that encoder efficiency may be increased as the dynamic range of the error signal decreases. Since displaced frame difference (DFD) is a measure of prediction error, minimization of its value in the displacement estimator is advantageous. Mathematically, if a pel at location $x_a$ is predicted with displacement $\hat{D}^{i-1}$ and intensity $I(x_a - \hat{D}^{i-1}, t-\tau)$, resulting in prediction error $DFD(x_a, \hat{D}^{i-1})$, the estimator should try to produce a new estimate, $\hat{D}^i$, such that $|DFD(x_a, \hat{D}^i)| \leq |DFD(x_a, \hat{D}^{i-1})|$. To this end, it is desired to recursively minimize $[DFD(x, \hat{D}^i)]^2$ at each moving area element, using a gradient type of approach. For example, using standard steepest descent techniques, the new estimate $\hat{D}^i$ may be related to the old estimate $\hat{D}^{i-1}$ such that:

$$\hat{D}^i = \hat{D}^{i-1} - (\epsilon/2)\nabla_D[DFD(x_a, \hat{D}^{i-1})]^2, \tag{11}$$

which may be expanded as:

$$\hat{D}^i = \hat{D}^{i-1} - \epsilon DFD(x_a, \hat{D}^{i-1})\nabla_D DFD(x_a, \hat{D}^{i-1}). \tag{12}$$

In both equations 11 and 12, $\nabla_D$ is the gradient with respect to displacement D, and $\epsilon$ is a positive scalar constant, typically in the range $10^{-5} < \epsilon < 10^{-2}$. The gradient $\nabla_D$ may be evaluated using the definition of DFD given in equation 9 and noting that $$\nabla_D(DFD(x_a,\hat{D}^{i-1})) = +\nabla I(x_a - \hat{D}^{i-1}, t-\tau) \quad (13)$$

where $\nabla$ is the gradient with respect to x. This substitution yields $$\hat{D}^i = \hat{D}^{i-1} - \epsilon DFD(x_a,\hat{D}^{i-1})\nabla I(x_a - \hat{D}^{i-1}, t-\tau) \quad (14)$$

where DFD and $\nabla I$ are evaluated by interpolation for nonintegral $\hat{D}^{i-1}$. A significant reduction in computation of $\nabla I$ is achieved by quantizing $\hat{D}^{i-1}$ to an integral value for the purposes of calculation of the gradient $\nabla I$. Thus, is $[\hat{D}^{i-1}]$ represents a rounded or truncated value of each of the components $\hat{D}^{i-1}$, then the estimator of equation (14) can be simplified to:

$$\hat{D}^i = \hat{D}^{i-1} - \epsilon DFD(x_a,\hat{D}^{i-1})\nabla I(x_a - [\hat{D}^{i-1}], t-\tau). \quad (15)$$

It should be pointed out that $\nabla_D$ could have been evaluated using equation (9), resulting in an estimator in which $\nabla I$ is evaluated at $(x_a, t)$ instead of $(x_a - \hat{D}^{i-1}, t-\tau)$ as above. This alternate method implies an assumption regarding the linearity of I which may not be valid if $D - \hat{D}^{i-1}$ is large. Also, there is no difference in the computational complexity if it is assumed that a linear interpolation of $I(x, t-\tau)$ is used to compute DFD, and the resulting displaced line and element differences are used to compute $\nabla I$ in equation (15).

In explaining the significance of equation (15), it is interesting to observe that at every iteration, there is added to the old estimate a vector quantity parallel to the direction of the spatial gradient of image intensity, the magnitude of which is proportional to the motion compensated prediction error $DFD(x_a,\hat{D}^{i-1})$. It may be seen from equation (9) that if the correction term $(D - \hat{D}^{i-1})$ is orthogonal to the intensity gradient $\nabla I$, the displaced frame difference DFD is zero, giving a zero update for recursion of equation (15). This may happen even though the object may have actually moved. However, this is not a failure of the motion estimation technique, but rather is identical to the situation in which an intensity ramp is translated, and only motion parallel to the ramp direction ($\nabla I$) is perceived. Motion perpendicular to the ramp direction is unobservable, and as such as arbitrary. Stated differently, it is only through the occurrence of edges with differing orientations in real pictures that convergence of $\hat{D}^i$ to the actual value of D is possible.

Figure 2:
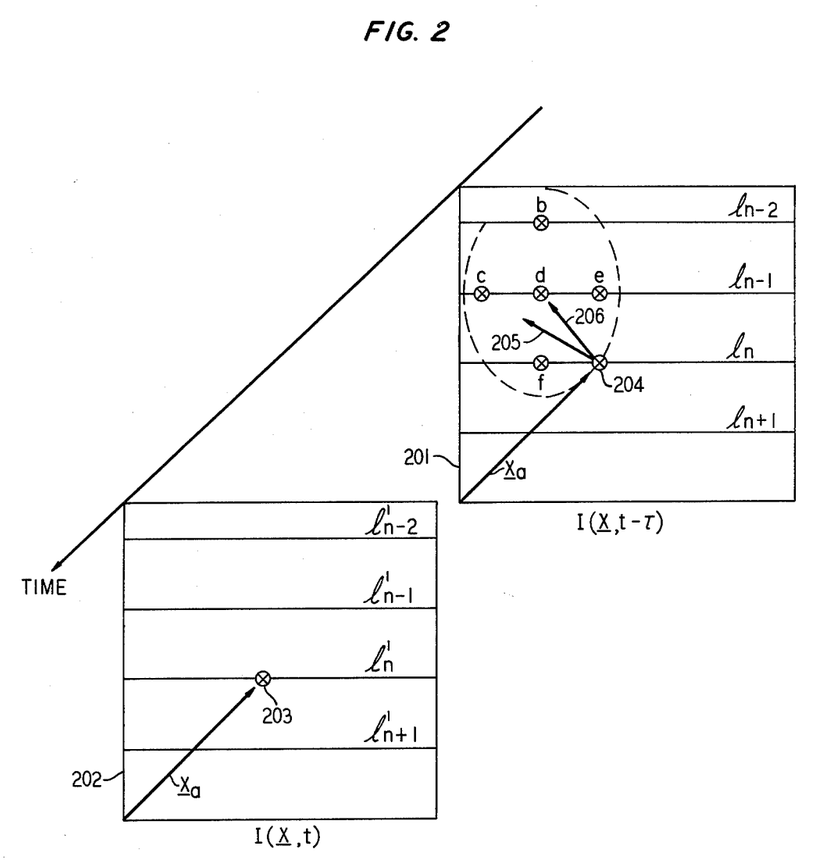
FIG. 2 is an illustration of the spatial locations involved in the technique used in the apparatus of FIG. 1.

The meanings of the quantities involved in equation (15) are graphically illustrated in FIG. 2, wherein rectangles 201 and 202 represent the spatial boundaries of past and present frames of a picture, respectively. In frame 201, a series of generally parallel scan lines $l_{n-2}$, $l_{n-1}$, $l_n$ and $l_{n+1}$ are shown in greatly expanded form for ease of explanation. The corresponding scan lines in frame 202 are designated $l'_{n-2}$, $l'_{n-1}$, $l'_n$ and $l'_{n+1}$.

In the present frame 202, the x at 203 represents the spatial location of the picture element for which a displacement estimate is being computed, and the vector $x_a$ indicates the location of element 203 with respect to a fixed coordinate system within the frame. In the previous frame 201, the x at 204 represents the same spatial location at $x_a$, and vector 205 represents the previous displacement estimate $-\hat{D}^{i-1}$.

In accordance with equation (15), $\hat{D}^{i-1}$ is rounded or truncated to the nearest integral value $[\hat{D}^{i-1}]$, for the purposes of calculating $\nabla I$. This is accomplished by considering the neighboring locations in the preceeding, present and subsequent scan lines (in this example, lines $l_{n-2}$, $l_{n-1}$ and $l_n$) to determine which discrete picture element best represents $\hat{D}^{i-1}$. In this context, the location of a discrete picture element is determined by the time at which the picture intensity signal was sampled. Thus, in FIG. 2, the ⓧ's labelled b, c, d, e and f represent pels which surround the location indicated by the tip of vector 205. In this example, the vector 206 from location 204 to pel d is closest to the location indicated by vector 204. Accordingly, $\nabla I(x_a - \hat{D}^{i-1}, t-\tau)$ is evaluated at pel d.

One simple scheme to estimate the gradient $\nabla I$ is to compute average vertical and horizontal intensity differences between pels surrounding pel d, and then combining these results vectorially. In this scheme, EDIF (horizontal component) $= (I_e - I_c)/2$ and LDIF (vertical component) $= (I_b - I_f)/2$, where $I_b$ is the intensity at pel b, $I_c$ is the intensity at pel c, and so on.

The other quantity in equation (15) that must be evaluated is $DFD(x_a,\hat{D}^{i-1})$, which is the intensity difference between pel 203 and the location indicated by vector 205. The intensity value at the latter location may be calculated by interpolation in much the same way as $\nabla I$, namely, by combining the correct fraction of EDIF and LDIF with the intensity values at pel d.

Figure 3:
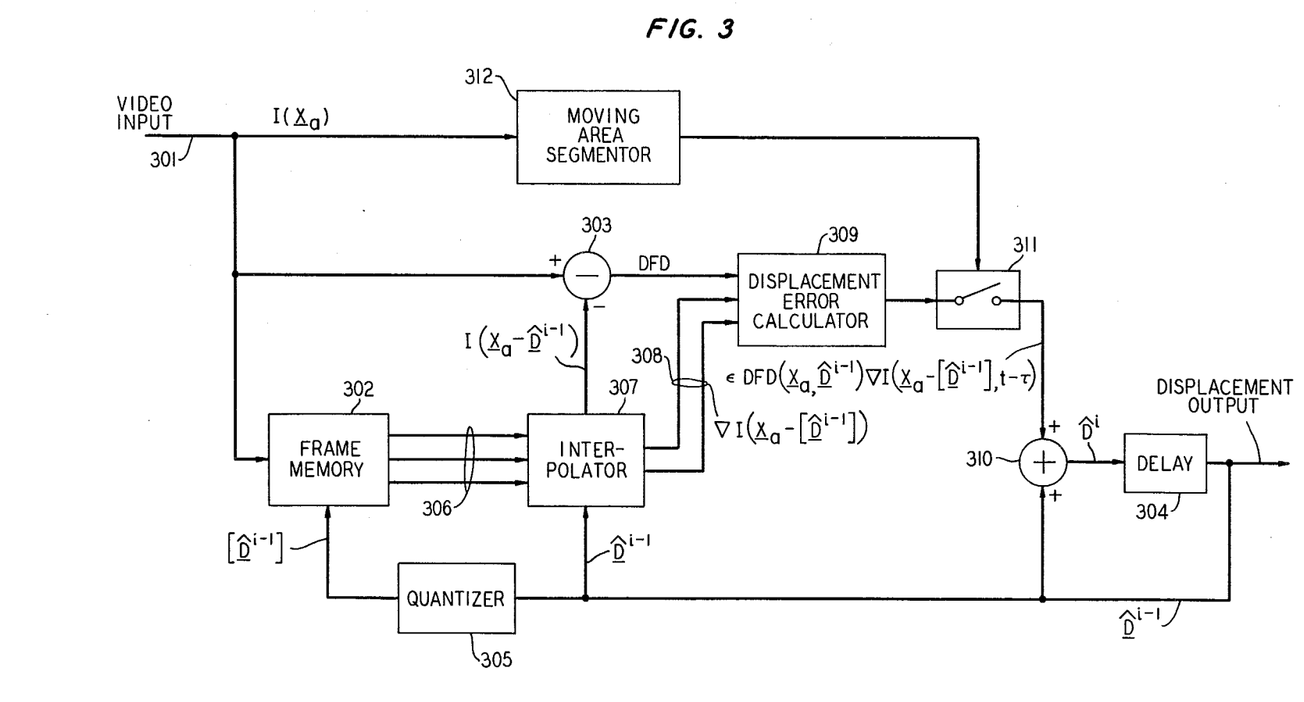
FIG. 3 is a block diagram of another embodiment of apparatus for computing displacement in accordance with the invention.

A block diagram of apparatus for computing a displacement estimate in accordance with equation (14) or (15) is shown in FIG. 3. The input video samples applied on line 301 are coupled to a frame memory 302 and to one input of a subtraction circuit 303. Assuming that the estimate of displacement from the previous frame $\hat{D}^{i-1}$ is stored in a delay circuit 304, its value is quantized in quantizer 305 and the integral portion thereof $[\hat{D}^{i-1}]$ is applied to the control input of frame memory 302. The latter, which may be similar in design to memory 102 of FIG. 1, is arranged to provide outputs on a series of lines 306 which represent the intensities of pels in the stored frame that surround the location of the pel $x_a - [\hat{D}^{i-1}]$ displaced from the pel location $x_a$ in the present frame which is being processed. For the example of FIG. 2, the intensities of pels b, c, e and f would be provided.

The intensity values output from memory 302 are applied to an interpolator 307, along with the previous displacement estimate output from delay element 304. Interpolator 307 has two functions, namely, to calculate the intensity gradient $\nabla I$ and to calculate the intensity value at the location $x_a - \hat{D}^{i-1}$. Both functions are straightforward and easily implemented linear interpolations. Apparatus well known to those skilled in the art for computing weighted averages may be used for this purpose.

The intensity value $I(x_a - \hat{D}^{i-1})$ calculated in interpolator 307 is coupled to the second input of subtractor circuit 303, the output of which is the displaced frame difference DFD defined in equation 8. This value is input to a displacement error calculator circuit 309, described below. The x and y components of intensity gradient formed in interpolator 307 are likewise coupled to inputs of circuit 309 on lines 308.

Calculator circuit 309 is designed to implement the error term calculation defined in equations (14) or (15), and may comprise appropriate multiplier and scaler circuits. The calculator may include another input, not shown, for controlling the value of $\epsilon$.

The output of circuit 309 is the displacement error or update term which is added to the previous displacement estimate stored in delay element 304, by an adder circuit 310. However, the update is performed only in the moving area of the picture and, for this reason, a switch 311 is interposed in the output line from circuit 309. Switch 311 is closed under the control of moving area segmenter 312, which receives an input on line 301. Segmenter 312 may be constructed in the same manner as that used for segmenter 120 of FIG. 1, so that switch 311 is closed only when the frame difference FDIF exceeds a preselected threshold. The output of the estimator of FIG. 3 may be taken either from delay element 304 or from the output of adder 310, since the former is simply a delayed version of the latter.

During the conduct of simulations to evaluate the performance of displacement estimation techniques in accordance with the present invention, it was found that equation (15) could be further simplified as follows:

$$\hat{D}^i = \hat{D}^{i-1} - \epsilon \cdot \text{sign}(DFD(x_j[\hat{D}^{i-1}] \cdot \text{sign}(\nabla I(X_i[-\hat{D}^{i-1}]))  \quad (21)$$

where the sign of a vector quantity is the vector of the signs of its components. The sign function, defined by equation (6), avoids the multiplication necessary for computation of the update term. Instead, the update of each displacement component from one picture element to the next consists of only three possibilities; 0, or $\pm \epsilon$. The performance of a predictive encoder using this simplification, in terms of encoder bits/field, was virtually the same as that of an encoder using an estimator which implements equation (15).

The displacement estimators of FIGS. 1 and 3 have in common the recursive updating of each displacement estimate, wherein the previous estimate is used to calculate the correction term. In the apparatus of FIG. 1, which implements equation (10), the displaced frame difference based upon the previous displacement estimate is normalized in accordance with picture activity (as measured by EDIF or LDIF), and accumulated, to become the updated displacement estimate. Recursion can be performed over a field, or a group of pels.

In the apparatus of FIG. 3, which implements equation (14) or (15), the intensity value and the intensity gradient are calculated in the neighborhood of the previous displacement estimate, scaled, and used to compute the new estimate. Recursion is typically performed on a pel-by-pel basis.

Those skilled in the art will appreciate that numerous changes in the present invention may readily be made. Accordingly, its scope is to be limited only by the following claims.

We claim:

1. Apparatus for generating an estimate of the displacement of an object in a video scene occurring between a prior frame and a present frame, comprising:
   means for calculating a first estimate of displacement using the difference in picture intensity between at least one picture element in said present frame and a spatially corresponding picture element in said previous frame,
   characterized by
   means for recursively updating said first displacement estimate using the intensity difference between said at least one picture element in said present frame and a location in said previous frame displaced from said corresponding picture element by said first displacement estimate.

2. The invention defined in claim 1 wherein said updating means includes:
   means (102, 104) for forming the intensity difference DFD (x, $\hat{D}^{i-1}$) between said at least one picture element at location x and a location in said previous frame displaced from location x by said first displacement estimate $\hat{D}^{i-1}$, and
   means (103, 105, 115) for normalizing DFD by a measure of the local intensity variations surrounding location x.

3. The invention defined in claim 2 wherein said normalizing means is arranged to compute the element difference EDIF between the intensity at location x and the intensity of the preceding picture element.

4. The invention defined in claim 2 wherein said normalizing means is arranged to compute the line difference LDIF between the intensity at location x and the intensity of the vertically displaced picture element on the preceding line.

5. The invention defined in claim 2 wherein said updating means further includes:
   means (111) for accumulating intensity differences for picture elements in a selected interval N, and
   means (109) for incrementing or decrementing said accumulating means as a function of said local intensity variations.

6. The invention defined in claim 5 wherein said apparatus further includes means (120) for including in said selected interval N only those picture elements having a frame difference (FDIF) which exceeds a threshold.

7. Apparatus for generating an estimate of the displacement of an object in a video scene occurring between a prior frame and a present frame, comprising:
   means (117) for storing a first displacement estimate, characterized by
   means (FIG. 1) for recursively updating said first displacement estimate using the intensity difference between at least one of the picture elements in said present frame and a location in said previous frame displaced from the spatially corresponding location of said picture element by said first displacement estimate.

8. The invention defined in claim 7 wherein said updating means includes:
   (a) means (102) for storing intensity values of picture elements in said previous frame and for selecting from said stored values the intensity value of said location in said previous frame in response to said first displacement estimate,
   (b) means (104) for computing said intensity difference by subtracting said selected intensity value from the intensity value of said at least one picture element,
   (c) means (111) for accumulating a series of said intensity differences for a series of picture elements in said present frame, and
   (d) means (115) for normalizing said accumulated differences by a measure of the local intensity differences in the neighborhood of said series of picture elements.

9. The invention defined in claim 7 wherein said updating means is arranged to compute, for picture elements within a preselected interval N, (1) an update term for displacement in the horizontal direction, given by $$\frac{\Sigma \, DFD(x, \hat{D}^{i-1}) \cdot \text{sign } EDIF(x)}{\Sigma \, | \, EDIF(x) \, |}$$

wherein EDIF(x) is the intensity difference between a picture element in said interval and the preceeding picture element on the same scan line, and DFD(x,$\hat{D}^{i-1}$) is the intensity difference between a picture element in said present frame at location x and a picture element in said previous frame displaced by said first displacement estimate $\hat{D}^{i-1}$, and (2) an updata term for displacement in the vertical direction given by $$\frac{\Sigma\ DFD(\underline{x},\hat{\underline{D}}^{i-1})\cdot sign\ LDIF(\underline{x})}{\Sigma\ |\ LDIF(\underline{x})\ |}$$

wherein LDIF(x) is the intensity difference between a picture element in said interval and the picture element above said element in the preceeding scan line.

10. The invention defined in claim 9 wherein said apparatus comprises means (120) for including in said interval only those picture elements having a frame difference which exceeds a threshold.

11. Apparatus for generating an estimate of the displacement of an object in a video scene occurring between a prior frame and a present frame comprising:
means for calculating a first estimate of displacement using the differences in picture intensity between a plurality of picture elements in said present frame and a first set of spatially corresponding picture elements in said previous frame, said selected elements having intensities which have frame differences which exceed a threshold value,
characterized by
means for repeatedly updating said first estimate using the differences between picture elements in said present frame and picture locations in said previous frame which are displaced from spatially corresponding pels in said previous frame by an amount related to said first estimate.

12. The invention defined in claim 11 wherein said updating means includes:
(a) a memory (302) for storing intensity values of picture elements in said previous frame,
(b) an interpolator (307) for computing the intensity and the intensity gradient at points in said previous frame displaced by said first estimate from points corresponding to said plurality of picture elements in said present frame,
(c) means (303) for computing the displaced frame difference at said displaced points, and
(d) means (309) for forming a weighted product of said intensity gradient value and said displaced frame difference.

13. Apparatus for estimating the displacement of an object in a video scene occurring between a first frame and a second frame, each of said frames including a plurality of picture element locations which lie along a series of generally parallel scan lines, each picture element in said first frame having a corresponding picture element in said second frame, said apparatus comprising:
(a) means for computing a first estimate of displacement $\hat{D}^{i-1}$ of said object using the intensity differences between corresponding picture element locations in said first and second frames; and
(b) means for storing said first estimate,
wherein said apparatus is characterized by a feedback connection between said storing means and said computing means for calculating at least one additional estimate $\hat{D}^i$ of said displacement.

14. The invention defined in claim 13 wherein said apparatus includes means for updating said first estimate to form said additional estimate according to $$\hat{\underline{D}}^i - \hat{\underline{D}}^{i-1} = - \left| \begin{array}{c} \frac{\Sigma\ DFD(\underline{x},\hat{\underline{D}}^{i-1})\cdot sign\ EDIF(\underline{x})}{\Sigma\ |\ EDIF(\underline{x})\ |} \\ \frac{\Sigma\ DFD(\underline{x},\hat{\underline{D}}^{i-1})\cdot sign\ LDIF(\underline{x})}{\Sigma\ |\ LDIF(\underline{x})\ |} \end{array} \right|$$

where DFD(x,$\hat{D}^{i-1}$) is the intensity difference between a picture element at location x in said first frame and a picture element at location x−$\hat{D}^{i-1}$ in second frame, EDIF(x) is the intensity difference between said picture element at location x and the previous element or the same scan line, and LDIF(x) is the intensity difference between said picture element at location x and the picture element above said element on the previous scan line.

15. The invention defined in claim 13 wherein said apparatus includes means for updating said first estimate to form said additional estimate according to $$D^i - D^{i-1} = \epsilon DFD(X,\hat{D}^{i-1})\nabla I(x - \hat{D}^{i-1}, t - \tau)$$

where DFD(x,$\hat{D}^{i-1}$) is the intensity difference between a picture element at location x in said first frame and a picture element at location x−$\hat{D}^{i-1}$ in said second frame, $\tau$ is the time between said frames, $\nabla I$(x−$\hat{D}^{i-1}$,t−$\tau$) is the intensity gradient at said picture element location X−$\hat{D}^{i-1}$ in said second frame, and $\epsilon$ is a scaling constant.

16. A method of generating an estimate of the displacement of an object in a video scene occurring between a prior frame and a present frame, comprising the step of:
calculating a first estimate of displacement using the difference in picture intensity between at least one picture element in said present frame and a spatially corresponding picture element in said previous frame,
characterized by the step of
recursively updating said first displacement estimate using the intensity difference between said at least one picture element in said present frame and a location in said previous frame displaced from said corresponding picture element by said first displacement estimate.

17. The method defined in claim 16 wherein said updating step includes:
forming the intensity difference DFD (x,$\hat{D}^{i-1}$) between said at least one picture element at location x and a location in said previous frame displaced from location x by said first displacement estimate $\hat{D}^{i-1}$, and
normalizing DFD by a measure of the local intensity variations surrounding location x.

18. The method defined in claim 17 wherein said normalizing step includes computing the element difference EDIF or the line difference LDIF between the intensity at location x and the intensity of a picture element in the immediate neighborhood of location x.

19. A method of estimating the displacement of an object in a video scene occurring between a first frame and a second frame, each of said frames including a plurality of picture element locations which lie along a series of generally parallel scan lines, each picture element in said first frame having a corresponding picture element in said second frame, said method including the steps of:

(a) computing a first estimate of displacement $\hat{D}^{i-1}$ of said object using the intensity differences between corresponding picture element locations in said first and second frames; and (b) storing said first estimate, wherein said method is characterized by (c) repeating said computing step using said first estimate to compute at least one additional estimate of displacement.

* * * * *